United States Patent
Borkar et al.

(10) Patent No.: US 11,431,591 B2
(45) Date of Patent: Aug. 30, 2022

(54) SYSTEMS AND METHODS FOR PRESENTING WORKSPACE EXPERIENCE INDICATOR ON USER INTERFACE

(71) Applicant: Citrix Systems, Inc., Fort Lauderdale, FL (US)

(72) Inventors: Vipin Borkar, Bengaluru (IN); Xiaolu Chu, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/400,803

(22) Filed: May 1, 2019

(65) Prior Publication Data
US 2020/0351183 A1 Nov. 5, 2020

(51) Int. Cl.
*H04L 43/00* (2022.01)
*H04L 43/045* (2022.01)
*H04L 41/5009* (2022.01)

(52) U.S. Cl.
CPC ........ *H04L 43/045* (2013.01); *H04L 41/5009* (2013.01)

(58) Field of Classification Search
CPC .............. H04L 43/045; H04L 41/5009; H04L 43/0864; H04L 67/141; H04L 67/42; G06F 3/048
See application file for complete search history.

(56) References Cited

U.S. PATENT DOCUMENTS

| | | | | |
|---|---|---|---|---|
| 6,526,371 B1 * | 2/2003 | Klein | ................ | G06F 11/3419 702/119 |
| 7,006,448 B1 * | 2/2006 | Thio | ................... | H04L 43/0864 370/252 |
| 8,819,171 B2 * | 8/2014 | Chakraborty | ....... | G06F 11/3428 709/217 |
| 9,538,345 B2 * | 1/2017 | Sah | ........................ | H04W 4/14 |
| 10,439,921 B1 * | 10/2019 | Dubey | ................ | H04B 17/318 |
| 2009/0204975 A1 * | 8/2009 | Hagiu | ..................... | G06F 9/542 719/314 |
| 2010/0161711 A1 * | 6/2010 | Makhija | ................. | H04L 69/02 709/203 |
| 2010/0278086 A1 * | 11/2010 | Pochiraju | .............. | H04L 67/125 370/310 |

(Continued)

*Primary Examiner* — Mahelet Shiberou
(74) *Attorney, Agent, or Firm* — Foley & Lardner LLP

(57) ABSTRACT

Described embodiments provide systems and methods for indicating virtual workspace performance on a graphical user interface of a computer system. In one such method, the computer system identifies one or more components of a virtual workspace executed on behalf of a user of the computer system, and analyzes a plurality of performance measurements of the identified one or more components of the virtual workspace. For each of the identified one or more components, the computer system determines an aggregated performance measurement for the component based on the plurality of performance measurements of the component, compares the aggregated performance measurement to a threshold, and selects a graphical indicator from a plurality of predetermined graphical indicators responsive to the comparison. The computer system renders, within a graphical user interface of the computer system, an identifier of the component and the selected graphical indicator.

14 Claims, 9 Drawing Sheets

(56) References Cited

U.S. PATENT DOCUMENTS

| | | | |
|---|---|---|---|
| 2010/0306163 A1* | 12/2010 | Beaty | G06F 9/5077 |
| | | | 706/52 |
| 2010/0322089 A1* | 12/2010 | Raja | H04L 41/5009 |
| | | | 370/252 |
| 2012/0166636 A1* | 6/2012 | Page | G06F 11/3409 |
| | | | 709/224 |
| 2014/0149573 A1* | 5/2014 | Tofighbakhsh | H04L 41/5067 |
| | | | 709/224 |
| 2015/0012644 A1* | 1/2015 | Kubota | G06F 11/3495 |
| | | | 709/224 |
| 2016/0174081 A1* | 6/2016 | Lau | G06F 16/9537 |
| | | | 455/457 |
| 2016/0380860 A1* | 12/2016 | Singhal | H04L 43/0864 |
| | | | 709/224 |
| 2017/0155537 A1* | 6/2017 | Maheshwari | H04L 41/064 |
| 2018/0248963 A1* | 8/2018 | Weis | H04L 67/20 |
| 2019/0052518 A1* | 2/2019 | Gal | H04L 41/5009 |
| 2020/0042573 A1* | 2/2020 | Presler-Marshall | |
| | | | G06F 11/3409 |
| 2020/0241894 A1* | 7/2020 | Li | G06F 9/45558 |
| 2020/0336396 A1* | 10/2020 | Su | H04L 43/08 |

\* cited by examiner

SYSTEMS AND METHODS FOR PRESENTING WORKSPACE EXPERIENCE INDICATOR ON USER INTERFACE

FIELD OF THE DISCLOSURE

The present application generally relates to virtual workspace systems, including but not limited to systems and methods for presenting a workspace experience indicator on a user interface.

BACKGROUND

A virtual workspace system enables an individual using one or more user devices, including personal devices, to access network resources, such as web applications, virtual applications, network applications, and remote file access applications. As the workforce of an enterprise becomes more mobile and work under various conditions, such virtual workspace systems can enable an individual to access various network resources from any geographical location using a user device with access to the Internet. However, various factors can affect the performance of network resources differently, with some network resources being more adversely affected than others. Due to differences between the user devices, the network resources, and the manner in which the network resources can be accessed, there are significant challenges in managing user experience and expectations in interacting with the network resources through the virtual workspace system.

SUMMARY

This Summary is provided to introduce a selection of concepts in a simplified form that are further described below in the Detailed Description. This Summary is not intended to identify key features or essential features, nor is it intended to limit the scope of the claims included herewith.

The present disclosure is directed towards systems and methods for presenting a workspace experience indicator on a user interface (UI) of a virtual workspace system. For example, a client application (e.g., a workspace application) can execute on a user device via an embedded browser to communicate with a server to present the UI to a user of the user device. The UI can enable the user to access one or more network resources through one or more links presented on the UI. The UI also can include a graphical indicator near or next to an identifier of each of the network resources to indicate, in real-time or near real-time, the performance (or experience) that the user can expect when using the network resource.

A user interface rendering agent (e.g., a workspace experience agent) can analyze various performance factors for each of the network resources, and select an appropriate graphical indicator for a corresponding network resource to present on the UI. For example, for each network resource, the user interface rendering agent can analyze a plurality of performance measurements for a corresponding network resource. The user interface rendering agent can normalize, weigh, and aggregate the performance measurements, and can compare the aggregated performance measurement with a threshold to select the appropriate graphical indicator.

In one aspect, this disclosure is directed to a method for indicating virtual workspace performance on a graphical user interface of a computer system. The method includes: identifying, by a computer system, one or more components of a virtual workspace executed on behalf of a user of the computer system, and analyzing, by the computer system, a plurality of performance measurements of the identified one or more components of the virtual workspace. For each of the identified one or more components, the method further includes determining, by the computer system, an aggregated performance measurement for the component based on the plurality of performance measurements of the component, comparing the aggregated performance measurement to a threshold, selecting a graphical indicator from a plurality of predetermined graphical indicators responsive to the comparison, and rendering, within a graphical user interface of the computer system, an identifier of the component and the selected graphical indicator.

In some embodiments, the analyzing the plurality of performance measurements may further include measuring a round trip response time between the computer system and a second computer system providing the virtual workspace.

In some embodiments, the analyzing the plurality of performance measurements may further include measuring a rendering time of the virtual workspace at the computer system.

In some embodiments, the analyzing the plurality of performance measurements may further include measuring a communication bandwidth between the computer system and a second computer system providing the virtual workspace.

In some embodiments, the determining the aggregated performance measurement may further include combining a plurality of measurements.

In some embodiments, a first component may be rendered by a remote computer system, and combining the plurality of measurements may further include combining a measurement of a rendering time of the virtual workspace at the remote computer system and a transfer time to transfer the rendered graphic to the computer system.

In some embodiments, the combining the plurality of measurements may further include multiplying each of the plurality of measurements by a predetermined coefficient corresponding to the measurement.

In some embodiments, a coefficient for a latency measurement may exceed a coefficient for a display resolution measurement.

In some embodiments, the analyzing the plurality of performance measurements may further include receiving an estimated performance measurement for a component, the estimation performed prior to execution of the component for the user of the computer system.

In some embodiments, the selecting a graphical indicator may further include selecting a graphical indicator responsive to the aggregated performance measurement exceeding the threshold.

In another aspect, this disclosure is directed to a system for indicating virtual workspace performance on a graphical user interface of a computer system. The system includes a first computer system including a user interface rendering agent. The first computer system is in communication with a second computer system providing a virtual workspace including one or more components. The user interface rendering agent is configured to analyze a plurality of performance measurements of the one or more components of the virtual workspace. For each of the identified one or more components, the user interface rendering agent is configured to determine an aggregated performance measurement for the component based on the plurality of performance measurements of the component, compare the aggregated performance measurement to a threshold, select a graphical indicator from a plurality of predetermined graphical indicators responsive to the comparison, and render, within a graphical user interface of the first computer system, an identifier of the component and the selected graphical indicator.

In some embodiments, the user interface rendering agent may be further configured to measure a round trip response time between the first computer system and the second computer system providing the virtual workspace.

In some embodiments, the user interface rendering agent may be further configured to measure a rendering time of the virtual workspace at the first computer system.

In some embodiments, the user interface rendering agent may be further configured to measure a communication bandwidth between the first computer system and the second computer system providing the virtual workspace.

In some embodiments, the user interface rendering agent may be further configured to determine the aggregated performance measurement by combining a plurality of measurements.

In some embodiments, a first component may be rendered by a remote computer system, and the user interface rendering agent may be further configured to combine a measurement of a rendering time of the virtual workspace at the remote computer system and a transfer time to transfer the rendered graphic to the first computer system.

In some embodiments, the user interface rendering agent may be further configured to multiply each of the plurality of measurements by a predetermined coefficient corresponding to the measurement.

In some embodiments, a coefficient for a latency measurement may exceed a coefficient for a display resolution measurement.

In some embodiments, the user interface rendering agent may be further configured to receive estimated performance measurement for a component, the estimation performed prior to execution of the component for a user of the first computer system.

In some embodiments, the user interface rendering agent may be further configured to select a graphical indicator responsive to the aggregated performance measurement exceeding the threshold.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a computing environment which may be useful for practicing embodiments described herein;

Section B describes a virtual workspace system which may be useful for practicing embodiments described herein; and Section C describes systems and methods for presenting a workspace experience indicator on a user interface.

A. Computing Environment

Prior to discussing the specifics of embodiments of the systems and methods of presenting a workspace experience indicator, it may be helpful to discuss the computing environments in which such embodiments may be deployed.

Figure 1:
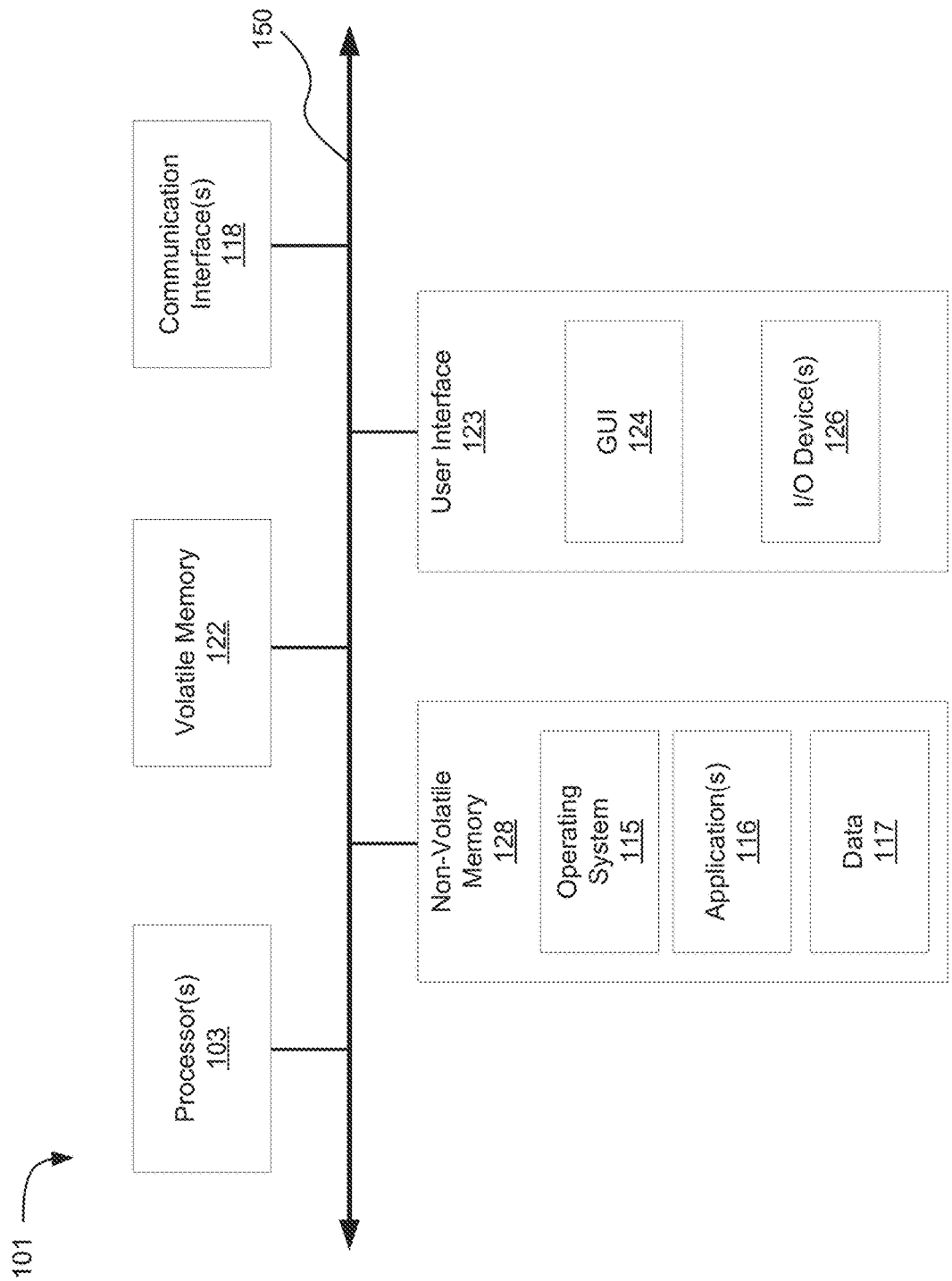
FIG. 1 is a block diagram of embodiments of a computing device.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

B. Workspace System

Prior to discussing the specifics of embodiments of the systems and methods of presenting a workspace experience indicator, it may be useful to generally discuss a virtual workplace system in which such embodiments may be deployed.

Figure 2:
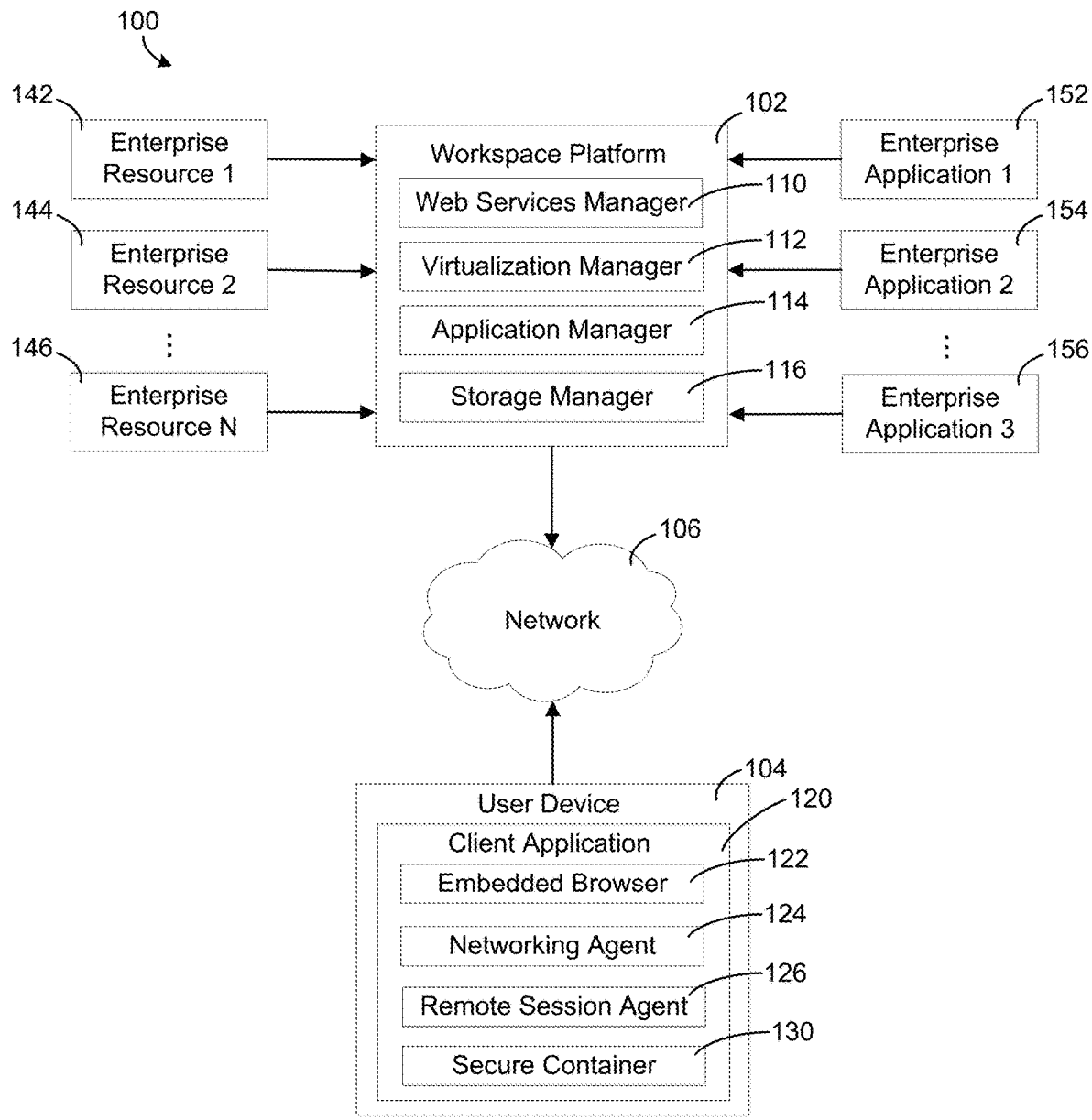
FIG. 2 is a block diagram of embodiments of a virtual workspace system.

FIG. 2 is a block diagram depicting a virtual workspace system, according to some embodiments. Referring to FIG. 2, the virtual workspace system 100 includes a workspace platform 102 and a user device 104 communicably connected to the workspace platform 102. Workspace platform 102 provides desktop virtualization services to enable remote access to one or more enterprise resources 142-146, enterprise applications 152-156, and/or other resources and applications that are served from and/or hosted on one or more servers of the workspace platform 102. The user device 104 accesses the various virtualization services provided by the workspace platform 102 via the network 106. In various embodiments, the network 106 may be a wired network, wireless network, cloud network, local area network, metropolitan area network, wide area network, public network, private network, and/or the like.

The enterprise resources 142-146 and/or the enterprise applications 152-156 may be premise-based, cloud-based, and/or the like. Various non-limiting examples of enterprise resources 142-146 and enterprise applications 152-156 include, but are not limited to, email servers, file sharing servers, SaaS/Web applications, virtual applications (e.g., hosted or virtual desktops), Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any suitable application server that is built to provide applications that are intended to run on a local Windows operating system, and the like. In some embodiments, some of the enterprise resources 142-146 and/or enterprise applications 152-156 may be provided by a $3^{rd}$ party, for example, such as 3rd party email services (e.g., Gmail), messaging services (e.g., Skype), documentation services (e.g., Office, Adobe, PowerPoint), file storage services (e.g., Dropbox), and the like.

The user device 104 can include any embodiment of a computing device described above in connection with at least FIG. 1, for example. The user device 104 can include any user device such as a desktop computer, a laptop computer, a tablet device, a smart phone, or any other mobile or personal device. The user device 104 can include or access a digital workspace of a user, which can include file system(s), cache or memory (e.g., including electronic clipboard(s)), container(s), application(s) and/or other resources on the user device 104. The digital workspace can include or extend to one or more networks accessible by the user device 104, such as the Internet, including file system(s) and/or other resources accessible via the one or more networks. A portion of the digital workspace can be secured via the use of the client application 120 with an embedded browser 122, for example. The secure portion of the digital workspace can include, for example, file system(s), cache or memory (e.g., including electronic clipboard(s)), application(s), container(s), and/or other resources.

A client application 120 executing on the user device 104 can allow a user to access enterprise resources (e.g. 142-146), applications (e.g., 152-156), and/or other virtualization services that are served from and/or hosted on one or more servers of the workspace platform 102, for example, such as web applications and software-as-a-service (SaaS) applications (hereafter sometimes generally referred to as network applications), virtual applications and virtual desktop sessions, remote storage access, and/or the like, which may be generally referred to as enterprise resources, virtual resources, hosted resources, online resources, cloud resources, or by similar terms. For example, in some embodiments, a browser 122 that is embedded or integrated with the client application 120 can render to the user a network application that is accessed or requested via the client application 120, and can enable interactivity between the user and the network application. The browser 122 is sometimes referred to as an embedded browser, and the client application 120 with the embedded browser 122 is sometimes referred to as a workspace application.

As shown in FIG. 2, in various embodiments, the workspace platform 102 includes one or more of a web services manager 110, a virtualization manager 112, an application manager 114, and a storage manager 116 to provide one or more of the virtualization services. Each of the web services manager 110, the virtualization manager 112, the application manager 114, and the storage manager 116 may include one or more servers to serve or host one or more of the enterprise resources (e.g. 142-146), the applications (e.g., 152-156), and/or other virtualization services to the user device 104. For example, in some embodiments, the web services manager 110 may provide a web based application (or webpage), such as a workspace application, including a user interface (UI) to the user device 104 to enable access to one or more of the resources, applications, or services of the workspace platform 102. The virtualization manager 112 may enable the user device 104 to establish a virtual session with a desktop hosted or otherwise served by the workspace platform 102. The application manager 114 may enable the user device 104 to access applications (e.g., SaaS applications) via the workspace platform 102. The storage manager 116 may enable the user device 104 to access documents or files in a remote storage device (or storage zone) hosted or served by the workspace platform 102.

In some embodiments, the client application 120 can establish a secure connection to the one or more servers (e.g., the web services manager 110, the virtualization manager 112, the application manager 114, and/or the storage manager 116) of the workspace platform 102 to provide an application session for the user to access a network application or a network service using the user device 104. In some embodiments, the embedded browser 122 can be integrated with the client application 120 to ensure that traffic related to the network application or network service is routed through and/or processed in the client application 120, which can provide the client application with real-time visibility to the traffic (e.g., when decrypted through the client application), and user interactions and behavior. The embedded browser 122 can provide a seamless experience to a user as the network application is requested via the user interface (shared by the client application and the embedded browser) and rendered through the embedded browser 122 within the same user interface. An example of the user interface (also referred to as a web UI) will be described in more detail below with reference to FIG. 4. In some embodiments, the workspace system 100 including the workspace platform 102 and the client application 120 with the embedded browser 122 may be similar to or the same as the CEB system described in U.S. patent application Ser. No. 16/129, 240, filed on Sep. 12, 2018, the disclosure of which is incorporated by reference herein in its entirety.

For example, in some embodiments, the client application 120 can include one or more components, such as the embedded browser 122, a networking agent 124, a remote session agent 126, and a secure container 130. One or more of the components can be installed as part of a software build or release of the client application 120, or separately acquired or downloaded and installed/integrated into an existing installation of the client application 120. For example, the user device 104 may download or otherwise receive the client application 120 (or any component) via the network 106. In other embodiments, the client application 120 may be an extension (e.g., an add-on, an add-in, an applet or a plug-in) to another application (e.g., the embedded browser 122) installed on the user device 104. The user device 104 may install the client application 120 to interface or inter-operate with the pre-installed application. In some embodiments, the client application 120 may be a stand-alone application. For example, the user device 104 may install the client application 120 to execute as a separate process.

The embedded browser 122 can include elements and functionalities of a web browser application or engine. The embedded browser 122 can locally render network application(s) as a component or extension of the client application 120. For example, the embedded browser 122 can interface with the web services manager 110 to render a Web application inside the client application 120. Similarly, the embedded browser 122 can interface with the application manager 114 to render a SaaS application inside the client application 120. Thus, the client application 120 may be provided with full visibility and control of the application session. The embedded browser 122 can be embedded or incorporated into the client application 120 via any suitable methods, such as direct integration (e.g., programming language or script insertion) into the executable code of the client application 120, via plugin installation, or the like. For example, the embedded browser 122 can include a Chromium based browser engine or other type of browser engine, that can be embedded into the client application 120, using the Chromium embedded framework (CEF) for example. In some embodiments, the embedded browser 122 can include a HTML5-based layout graphical user interface (GUI). The embedded browser 122 can provide HTML rendering and JavaScript support to the client application 120 incorporating various programming languages. For example, elements of the embedded browser 122 can bind to a client application 120 incorporating C, C++, Delphi, Go, Java, .NET/Mono, Visual Basic 6.0, and/or Python.

In some embodiments, the embedded browser 122 can incorporate code and functionalities beyond that available or possible in a standard or typical browser. For example, in some embodiments, the embedded browser 122 can bind with or be assigned with the secured container 130, to define at least part of the secured portion of a user's digital workspace. In some embodiments, the embedded browser 122 can bind with or be assigned with a portion of the user device's cache to form a secured clipboard (e.g., local to the client device, or extendable to other devices), that can be at least part of the secured container 130. The embedded browser 122 can be integrated with the client application 120 to ensure that traffic related to network applications or services is routed through and/or processed in the client application 120, which can provide the client application 120 with real-time visibility to the traffic (e.g., when decrypted through the client application). This visibility to the traffic can allow the client application 120 to perform or facilitate policy-based management (e.g., including data loss prevention (DLP) capabilities), application control, and collection and production of analytics.

In some embodiments, the networking agent 124 can establish or facilitate establishment of a network connection between the client application 120 and one or more resources (e.g., the web services manager 110, the virtualization manager 112, the application manager 114, and/or the storage manager 116) of the workspace platform 102. The networking agent 124 is sometimes referred to as a software-defined wide area network (SD-WAN) agent, mVPN agent, or microVPN agent. The networking agent 124 can perform handshaking for a requested connection from the client application 120 to access a network application or service (or other virtualization service), and can establish the requested connection (e.g., secure or encrypted connection). The networking agent 124 can connect to enterprise resources and applications (including services) for example via a virtual private network (VPN). For example, the networking agent 124 can establish a secure socket layer (SSL) VPN between the client application 120 and the application manager 114 providing a network application. The VPN connections, sometimes referred to as microVPN or application-specific VPN, may be specific to particular network applications, particular devices, particular secured areas on the client device, and the like. Such VPN connections can carry Microsoft Exchange traffic, Microsoft Active Directory traffic, HyperText Transfer Protocol (HTTP) traffic, HyperText Transfer Protocol Secure (HTTPS) traffic, as some examples.

In some embodiments, the remote session agent 126 (sometimes referred to as HDX engine) can support one or more display remoting protocols, for example, such as High-Definition User Experience (HDX), Independent Computing Architecture (ICA), and/or other suitable display remoting protocols. In some embodiments, the remote session agent 126 can establish a remote desktop session and/or virtual application session with the virtualization manager 112 in accordance to any variety of protocols, such as the Remote Desktop Protocol (RDP), Appliance Link Protocol (ALP), Remote Frame Buffer (RFB) Protocol, ICA Protocol, and the like. For example, the remote session agent 126 can establish a virtual application session with the virtualization manager 112 for a user of the client device 104 to access an enterprise network application. The remote session agent 126 can establish the remote application session within or over a secure connection (e.g., a VPN) established by the networking agent 124, for example.

In some embodiments, the secure container 130 can include a logical or virtual delineation of one or more types of resources accessible within the user device 104 and/or accessible by the user device 104. For example, the secure container 130 can refer to the entirety of the secured portion of the digital workspace, or particular aspect(s) of the secured portion. In some embodiments, the secure container 130 corresponds to a secure cache (e.g., electronic or virtual clipboard), and can dynamically incorporate a portion of a local cache of each user device of a user, and/or a cloud-based cache of the user, that is protected or secured (e.g., encrypted).

In some embodiments, the secure container 130 can include a secure document container for documents. A document can comprise any computer-readable file including text, audio, video, and/or other types of information or media. A document can comprise any single one or combination of these media types. As described herein, the secure container 130 can help prevent the spread of enterprise information to different applications and components of the user device 104, as well as to other devices. The enterprise system (which can be partially or entirely within a cloud network) can transmit documents to various devices, which can be stored within the secure container 130. The secure container 130 can prevent unauthorized applications and other components of the user device 104 from accessing information within the secure container 130. For enterprises that allow users to use their own user devices for accessing, storing, and using enterprise data, providing secure container 130 on the user devices helps to secure the enterprise data. For example, providing secure containers on the user devices can centralize enterprise data in one location on each user device, and can facilitate selective or complete deletion of enterprise data from each user device when desired.

In some embodiments, the secure container 130 can include an application that implements a file system that stores documents and/or other types of files. The file system can comprise a portion of a computer-readable memory of the user device 104. The file system can be logically separated from other portions of the computer-readable memory of the user device 104. In this way, enterprise data can be stored in the secure container 130 and private data can be stored in a separate portion of the computer-readable memory of the user device 104, for example. The secure container 130 can allow the client application 120, workspace platform 102, network applications accessed via the client application 120, locally installed applications, and/or other components of the user device 104 to read from, write to, and/or delete information from the file system (if authorized to do so). Deleting data from the secure container 130 can include deleting actual data stored in the secure container 130, deleting pointers to data stored in the secure container 130, deleting encryption keys used to decrypt data stored in the secure container 130, and/or the like. The secure container 130 can be installed by, e.g., the client application 120, an administrator, or the user device manufacturer. The secure container 130 can enable some or all of the enterprise data stored in the file system to be deleted without modifying private data stored on the user device 104 outside of the secure container 130. The file system can facilitate selective or complete deletion of data from the file system. For example, an authorized component of the enterprise's system can delete data from the file system based on, e.g., encoded rules. In some embodiments, the client application 120 can delete the data from the file system, in response to receiving a deletion command from the enterprise's system.

The secure container 130 can include an access manager that governs access to the file system by applications and other components of the user device 104. Access to the file system can be governed based on document access policies (e.g., encoded rules) maintained by the client application 120, in the documents and/or in the file system. A document access policy can limit access to the file system based on (1) which application or other component of the user device 104 is requesting access, (2) which documents are being requested, (3) time or date, (4) geographical position of the user device 104, (5) whether the requesting application or other component provides a correct certificate or credentials, (6) whether the user of the user device 104 provides correct credentials, (7) other conditions, or any combination thereof. A user's credentials can comprise, for example, a password, one or more answers to security questions (e.g., What is the mascot of your high school?), biometric information (e.g., fingerprint scan, eye-scan), and the like. Hence, by using the access manager, the secure container 130 can be configured to be accessed only by applications that are authorized to access the secure container 130. As one example, the access manager can enable enterprise applications installed on the user device 104 to access data stored in the secure container 130 and to prevent non-enterprise applications from accessing the data stored in the secure container 130.

Each of the above-mentioned elements or entities is implemented in hardware, or a combination of hardware and software, in one or more embodiments. Each component of the system 100 may be implemented using hardware or a combination of hardware or software detailed above in connection with FIG. 1. For example, each of these elements or entities can include any application, program, library, script, task, service, process or any type and form of executable instructions executing on hardware of a user device (e.g., the client application 120). The hardware includes circuitry such as one or more processors in one or more embodiments.

C. Systems and Methods for Presenting a Workspace Experience Indicator

In various embodiments, the client application 120 enables the user of the user device 104 to remotely access various enterprise resources 142-146, enterprise applications 152-156, and/or other resources and applications by utilizing one or more virtualization services provided by the workspace platform 102. For example, in various embodiments, the client application 120 may communicate with the workspace platform 102 to provide a web user interface (web UI) on the user device 104 via the embedded browser 122. The web UI may include a portal or web page including various links or icons to enable access to one or more of the enterprise resources 142-146, enterprise applications 152-156, and/or other resources and applications available to the user of the user device 104. The ability to access various virtualization services provided by the workspace platform 102 using the web UI enhances mobility of the user, since the user can access the workspace platform 102 via any user device having the client application 120 from any geographic location with access to the Internet. However, many factors can affect the performance of a particular resource or application, for example, such as network performance factors, hardware performance factors, device performance factors, and/or the like, which may not be readily apparent from the web UI. In this case, when the user has a bad experience, the user is likely to assume that there is some sort of connectivity issue with the workplace platform 102 itself, even if the source of the issue may actually be with the particular resource or service that the user is attempting to access. Further, the user may be unable to prioritize tasks, since the user cannot determine the resources and services that are currently experiencing issues and those that are not.

According to various embodiments, a web UI is presented on the user device 104 (e.g., via the embedded browser 122) that includes one or more graphical indicators to indicate, in real-time or near real-time, the experience that a user can expect with a particular resource, application, or service that is served from or hosted on one or more servers of the workspace platform 102. For example, in some embodiments, a workspace experience agent may be provided on at least one of the client application 120 or the workspace platform 102 to analyze various performance factors of a particular virtualization service (e.g., enterprise resource or application). The workspace experience agent may select a graphical indicator indicating the real-time expected performance of the particular resource or application based on the analysis of the performance factors, and the graphical indicator may be presented on the web UI to indicate the current performance experience with the particular virtualization service (e.g., resource or application).

Figure 3:
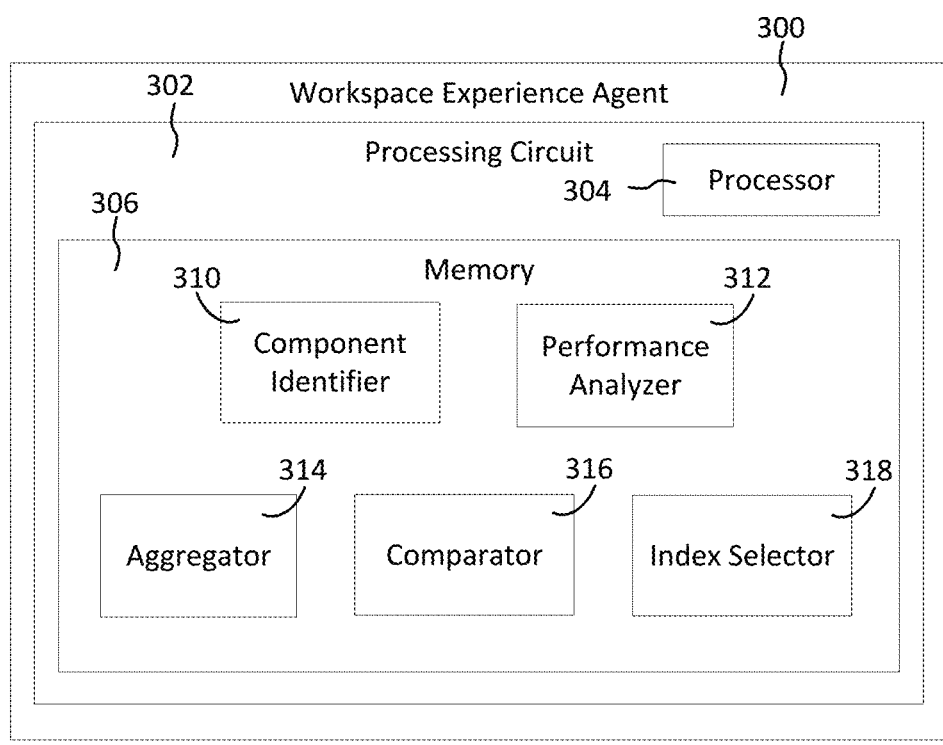
FIG. 3 is a block diagram of a workspace experience agent, according to some embodiments.

In more detail, FIG. 3 shows a block diagram of a workspace experience agent, according to some embodiments. Referring to FIG. 3, the workspace experience agent 300 analyzes various performance factors for one or more components (e.g., a particular virtualization service, enterprise resource, or application) of a virtual workspace executed on a user device to select one or more graphical indicators for presentation on the user device. It should be noted that the components of the workspace experience agent 300 can be integrated within a single device or distributed across multiple separate systems or devices. In other embodiments, some or all of the components of workspace experience agent 300 can be implemented as part of a cloud-based computing system. In other embodiments, some or all of the components of workspace experience agent 300 can be components of an enterprise resource, an enterprise application, or any other resources and applications provided via a virtualization service of the workspace platform 102 to the client application 120 of the user device 104. In other various embodiments, the workspace experience agent 300 may be a logical portion of the client application 120, a logical portion of the workspace platform 102, or logical portions of both the client application 120 and the workspace platform 102.

As shown in FIG. 3, in some embodiments, the workspace experience agent 300 includes a processing circuit 302 including one or more processors 304 and memory 306. In other embodiments, the workspace experience agent 300 may include any embodiment of a computing device described above in connection with at least FIG. 1, for example. Referring to the embodiment shown in FIG. 3, processor 304 can be a general purpose or specific purpose processor, an application specific integrated circuit (ASIC), one or more field programmable gate arrays (FPGAs), a group of processing components, or other suitable processing components. Processor 304 is configured to execute computer code or instructions stored in memory 306 or received from other computer readable media (e.g., CDROM, network storage, a remote server, etc.).

Memory 306 can include one or more devices (e.g., memory units, memory devices, storage devices, etc.) for storing data and/or computer code for completing and/or facilitating the various processes described in the present disclosure. Memory 306 can include random access memory (RAM), read-only memory (ROM), hard drive storage, temporary storage, non-volatile memory, flash memory, optical memory, or any other suitable memory for storing software objects and/or computer instructions. Memory 306 can include database components, object code components, script components, or any other type of information structure for supporting the various activities and information structures described in the present disclosure. Memory 306 can be communicably connected to processor 304 via processing circuit 302 and can include computer code for executing (e.g., by processor 304) one or more processes described herein.

In some embodiments, memory 306 includes a component identifier 310, a performance analyzer 312, an aggregator 314, a comparator 316, and an index selector 318. In some embodiments, the component identifier 310 identifies one or more components or virtual services (e.g., web applications, network applications, virtual applications, remote file access, or the like) of a virtual workspace executed on a computing device on behalf of the user. For example, in some embodiments, the component identifier 310 may receive a notification or alert of an event from the embedded browser 122 or the web services manager 110 that a virtual workspace is being executed on the user device 104, and may identify each of the virtual services that the user is enabled to access via the virtual workspace. In some embodiments, the component identifier 310 may determine a type of the virtual service of each of the identified components. For example, in some embodiments, the component identifier 310 may determine that a particular component is one of a web application (e.g., web UI), a network application (e.g., SaaS application), a virtual application (e.g., hosted or virtual desktop), remote file access service, or the like.

In some embodiments, for each identified component the performance analyzer 312 may analyze one or more performance factors (e.g., network factors, device factors, hardware factors, and/or the like), depending on the type of the component. For example, in the case of a web application (e.g., web UI), the performance analyzer 312 may receive, measure, or calculate a round trip response time between a resource or application providing the web application, and a rendering time of the web application. In another example, in the case of a virtual application (e.g., hosted or virtual desktop), the performance analyzer 312 may receive, measure, or calculate a round trip response time, a frame rate (e.g., FPS), a communication bandwidth between the user device 104 and a computing system providing the virtual application, and may identify network latencies. In still another example, in the case of a network application (e.g., SaaS application), the performance analyzer 312 may receive, measure, or calculate a round trip response time, a rendering time of the network application, a rendering time of a key URL in the network application, and may determine one or more policy configurations for accessing the network application. In yet another example, in the case of a remote file access request, the performance analyzer 212 may receive, measure, or calculate a download time of the file at a computing device providing the file access component, a round trip latency time to a second computing device providing the file, and may estimate a time for displaying the file in a file viewer of an application executed on the user device 104. Accordingly, in some embodiments, the performance analyzer 312 may communicate with any suitable resource, application, module, or service of the workspace platform 102 and/or the client application 120 to receive, measure, calculate, estimate, or identify any data or information relevant to determine any one of the performance factors.

In some embodiments, the aggregator 314 may process the performance factors for each of the identified components to generate an aggregated performance measurement for each of the identified components. In some embodiments, the aggregator 314 can apply weightages to the performance factors depending on its importance to the overall experience of the user with a particular component. For example, in some embodiments, the aggregator 314 may multiply each of the performance factors for a corresponding component by a predetermined coefficient corresponding to the performance factor, such that a performance factor having a greater weight is multiplied by a coefficient that exceeds a coefficient corresponding to a performance factor having a lesser weight. In some embodiments, the aggregator 314 can combine (e.g., add, multiply, or the like) the performance factors of a particular component to generate the aggregated performance measurement for the particular component.

In some embodiments, the aggregator 314 can combine the aggregated performance measurements of two or more components depending on a combination of the virtual services that are executed. For example, the user may access a hosted or virtual desktop via the web UI, and may access a web based workspace through the hosted or virtual desktop. In this case, the embedded browser 122 may retrieve the web UI via a web application component, the embedded browser 122 may open an ICA session in response to the user accessing a virtual application component (e.g., hosted or virtual desktop) via the webUI, and the virtual application component may access the web based workspace via a network application component (e.g., a SaaS application). In this case, each of the aggregated performance measurements of the web application component, the virtual application component, and the network application component can be combined (e.g., added, multiplied, or the like) to generate a combined aggregated performance measurement.

Still referring to FIG. 3, in some embodiments, the comparator 316 compares the aggregated performance measurements for each of the components with a corresponding threshold, and the index selector 318 selects a graphical indicator responsive to the comparison for each of the components. In some embodiments, the threshold may include a plurality of threshold values. For example, in some embodiments, the threshold may include a first threshold value indicating best performance and a second threshold value indicating poor performance. In this case, if the aggregated performance measurement is greater than the first threshold value, then a first graphical indicator indicating best performance may be selected. If the aggregated performance measurement is less than the first threshold value but greater than the second threshold value, then a second graphical indicator indicating OK performance may be selected. On the other hand, if the aggregated performance measurement is less than the second threshold value, then a third graphical indicator indicating poor performance may be selected. Other examples may include other suitable threshold values and performance indicator ranges. In some embodiments, the threshold values may depend on the type of component (or virtualization service) being analyzed, and the threshold values corresponding to one type of component may be different from the threshold values corresponding to another type of component.

Figure 4:
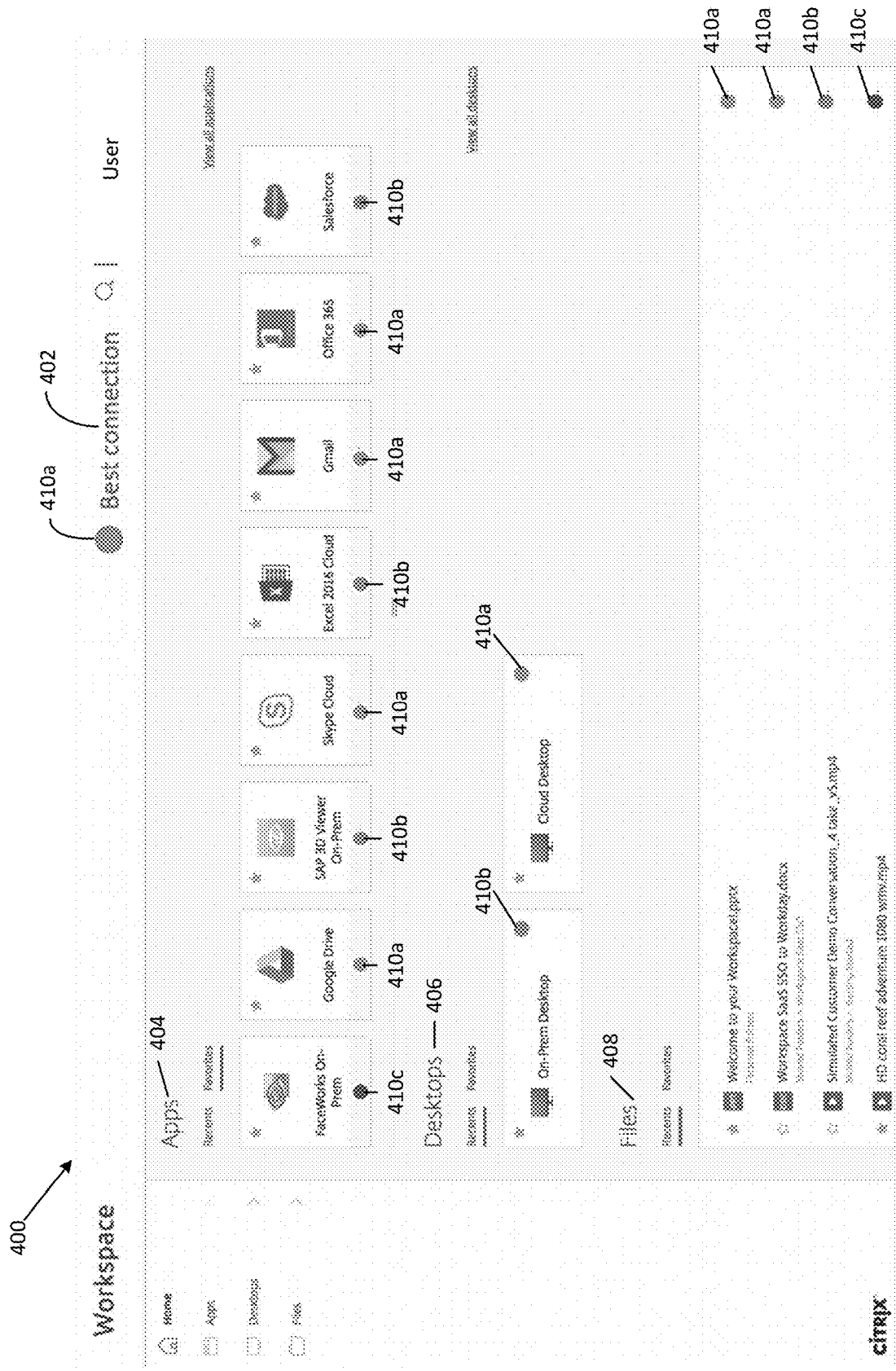
FIG. 4 depicts a non-limiting example of a web UI including graphical performance indicators, according to some embodiments.

The index selector 318 provides each of the selected graphical indicators for each of the components to the client application 120 (e.g., the embedded browser 122) and/or the workspace platform 102 (e.g., the web services manager 110), so that the graphical indicators can be displayed with (e.g., at or near) an identifier of the component. For example, FIG. 4 depicts a non-limiting example of a web UI 400 presented on the user device 104 via the embedded browser 120. The web UI 400 shows a home page of a workspace application. As shown in FIG. 4, the web UI 400 enables the user to access any authorized component or virtualization services, for example, such as web/SaaS applications 404, virtual applications 406, and remotely stored files 408. Next to each of the components or virtualization services, the web UI 400 presents corresponding graphical indicators 410a-410c to indicate an expected experience with the corresponding component. For example, as shown in FIG. 4, a first graphical indicator 410a (shown in green) indicates best performance, a second graphical indicator 410b (shown in orange) indicates OK performance, and a third indicator 410c (shown in red) indicates poor performance. In some embodiments, the web UI 400 shows an identifier 402 next to an indicator 410a corresponding to the expected performance with the connection to the web UI 400 itself.

Accordingly, when a user views the web UI 400, the user can quickly determine from the indicators 410a-410c those components that are currently experiencing issues and those that are not. Further, the user can determine from the identifier 402 that connection to the web UI 400 itself is strong (as indicated by the graphical performance indicator 410a). Thus, the user is enabled to prioritize tasks that can be performed using components with better expected experiences, rather than attempting to perform tasks that require the use of components with poor expected experiences. While the example shown in FIG. 4 depicts the indicators as colored circles at or near an icon representing a particular component, the present disclosure is not limited thereto. For example, the indicators can have other shapes and/or other colors. In other examples, the indicators can be represented by other graphics, such as animations, emojis, and/or the like, or even text (e.g., best, good, medium, poor, or the like).

Figure 5:
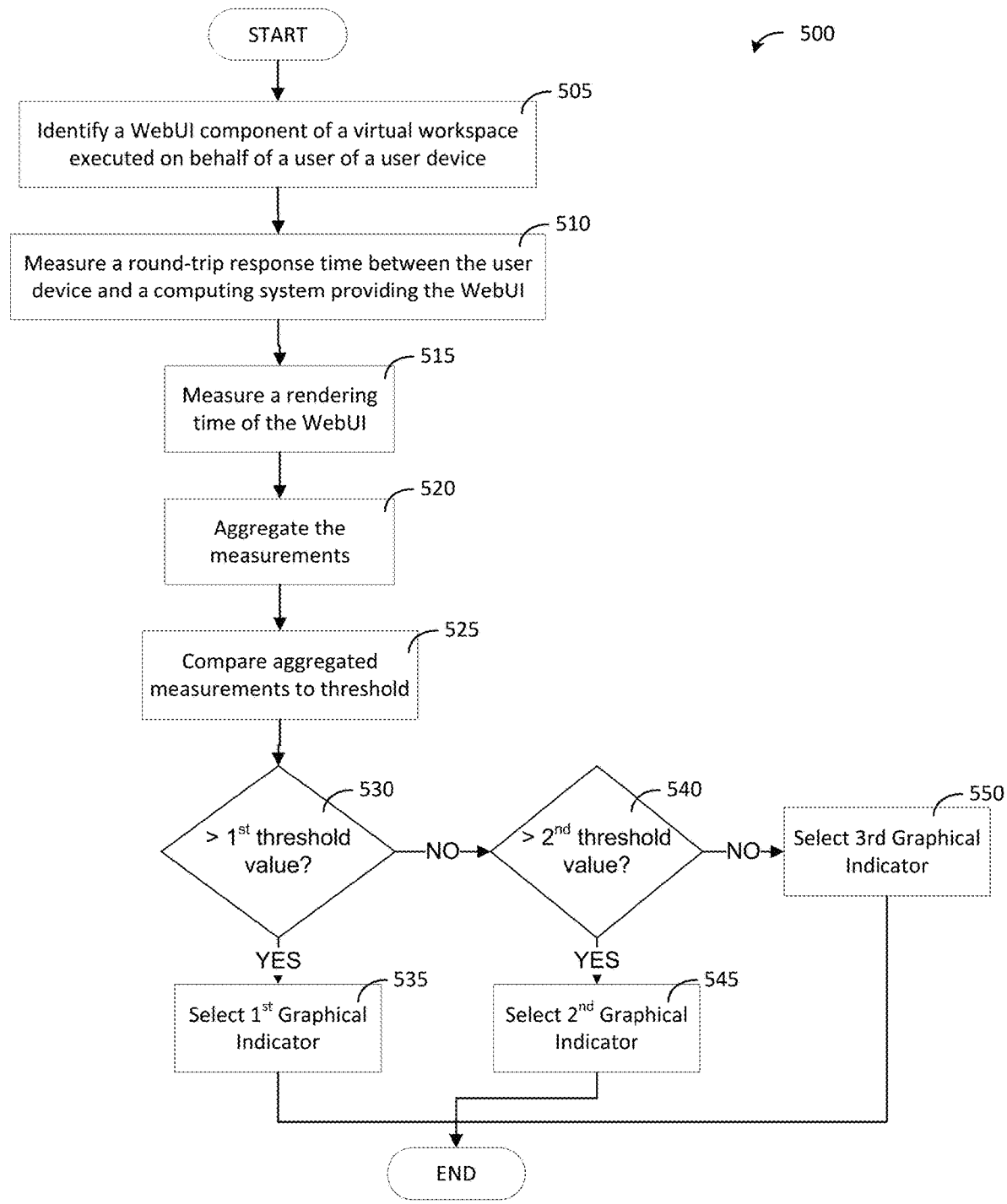
FIG. 5 is a flow diagram of a method for selecting a graphical performance indicator for a web UI, according to some embodiments.

Referring now to FIG. 5, a method 500 of selecting a graphical performance indicator for a web UI is shown, according to some embodiments. The functionalities of the method 500 may be implemented using, or performed by, the components detailed herein in connection with FIGS. 1-4. In brief overview, the method 500 of FIG. 5 may be used, for example, to select the graphical performance indicator for the identifier 402 shown in FIG. 4. In the example shown in FIG. 4, the graphical performance indicator may be selected based on a round-trip response time to reach the workspace platform 102 and a rendering time of the web UI (e.g., in milliseconds). In some embodiments, the graphical performance indicator selected may be different depending on a geographical location of the user device 104 (e.g., home or in the office), as well as a communication bandwidth of the network used to communicate with the workspace platform 102.

In more detail, the process 500 starts and at operation 505, a web UI component of a virtual workspace executed on behalf of a user of a user device is identified. For example, in some embodiments, the component identifier 310 of the workspace experience agent 300 may receive a notification or alert from the embedded browser 122 or the web services manager 110 that the user device 104 is requesting the web UI from the web services manager 110 for presentation on the embedded browser 122 of the user device 104.

At operation 510, a round-trip response time between the user device 104 and a computing system providing the web UI is measured. For example, in some embodiments, the performance analyzer 312 of the workspace experience agent 300 may measure a request time from when the embedded browser 122 transmits a request to the web services manager 110 and a response time of when the web services manager 110 transmits a response to the request. In some embodiments, the round-trip response time may be a combination of the request time and the response time. In other embodiments, the round-trip response time may be received from another device (e.g., an intermediate device) between the embedded browser 122 and the web services manager 110 (e.g., a network gateway, Citrix Secure Web gateway, and/or any suitable Cloud service) directly or indirectly.

At operation 515, a rendering time of the web UI is measured. For example, in some embodiments, the performance analyzer 312 of the workspace experience agent 300 may measure a time it takes to render content of the web UI. In some embodiments, the rendering time of the web UI may be measured for a group of similarly situated users (e.g., users located in the same or similar network segment or physical location (e.g., office)). For example, the rendering time that is measured, calculated, or received for one user of the group of similarly situated users may be used for other users of the group of similarly situated users to reduce a time for selecting and displaying a corresponding one of the graphical indicators.

At operation 520, the measurements are aggregated. For example, in some embodiments, the aggregator 314 of the workspace experience agent 300 may add the round-trip response time measured at operation 510 to the rendering time measured at operation 520. In some embodiments, the aggregator 314 may apply suitable weights to the measurements prior to combining the measurements. For example, in some embodiments, the aggregator 314 may multiply each of the measurements with a suitable coefficient corresponding to a weightage of the measurement. In some embodiments, the weighted measurements may then be combined (e.g., added, multiplied, or the like) by the aggregator 314.

At operation 525, the aggregated measurement resulting from operation 520 is compared to a threshold. For example, in some embodiments, the comparator 316 of the workspace experience agent 300 may compare the aggregated measurement with one or more threshold values. The threshold values may be set or predetermined to correspond to a plurality of performance ranges. For example, a $1^{st}$ threshold value may correspond to a best or optimal performance, and a $2^{nd}$ threshold value may correspond to a bad or poor performance. In some embodiments, the $1^{st}$ and $2^{nd}$ threshold values in the case of a web application may be different from the threshold values for other cases (e.g., virtual applications, network applications, file access applications, or the like).

In this case, as shown in FIG. 5, the aggregated measurement resulting from operation 520 is compared with the $1^{st}$ threshold value at operation 530. If the aggregated measurement is greater than the $1^{st}$ threshold value at operation 530 (e.g., YES), then a $1^{st}$ graphical indicator indicating the best or optimal performance is selected (e.g., by the index selector 318 of the workspace experience agent 300) at operation 535 and the process 500 ends. On the other hand, if the aggregated measurement is not greater than the $1^{st}$ threshold value at operation 530 (e.g., NO), then the aggregated measurement is compared with the second threshold value at operation 540. If the aggregated measurement is greater than the $2^{nd}$ threshold value at operation 540 (e.g., YES), then the aggregated measurement is determined to be between the $1^{st}$ threshold value and the $2^{nd}$ threshold value. Accordingly, a $2^{nd}$ graphical indicator indicating OK or medium performance is selected at operation 545 and the process 500 ends. On the other hand, if the aggregated measurement is less than the $2^{nd}$ threshold value at operation 540 (e.g., NO), then a $3^{rd}$ graphical indicator indicating bad or poor performance is selected at operation 550 and the process 500 ends.

Figure 6:
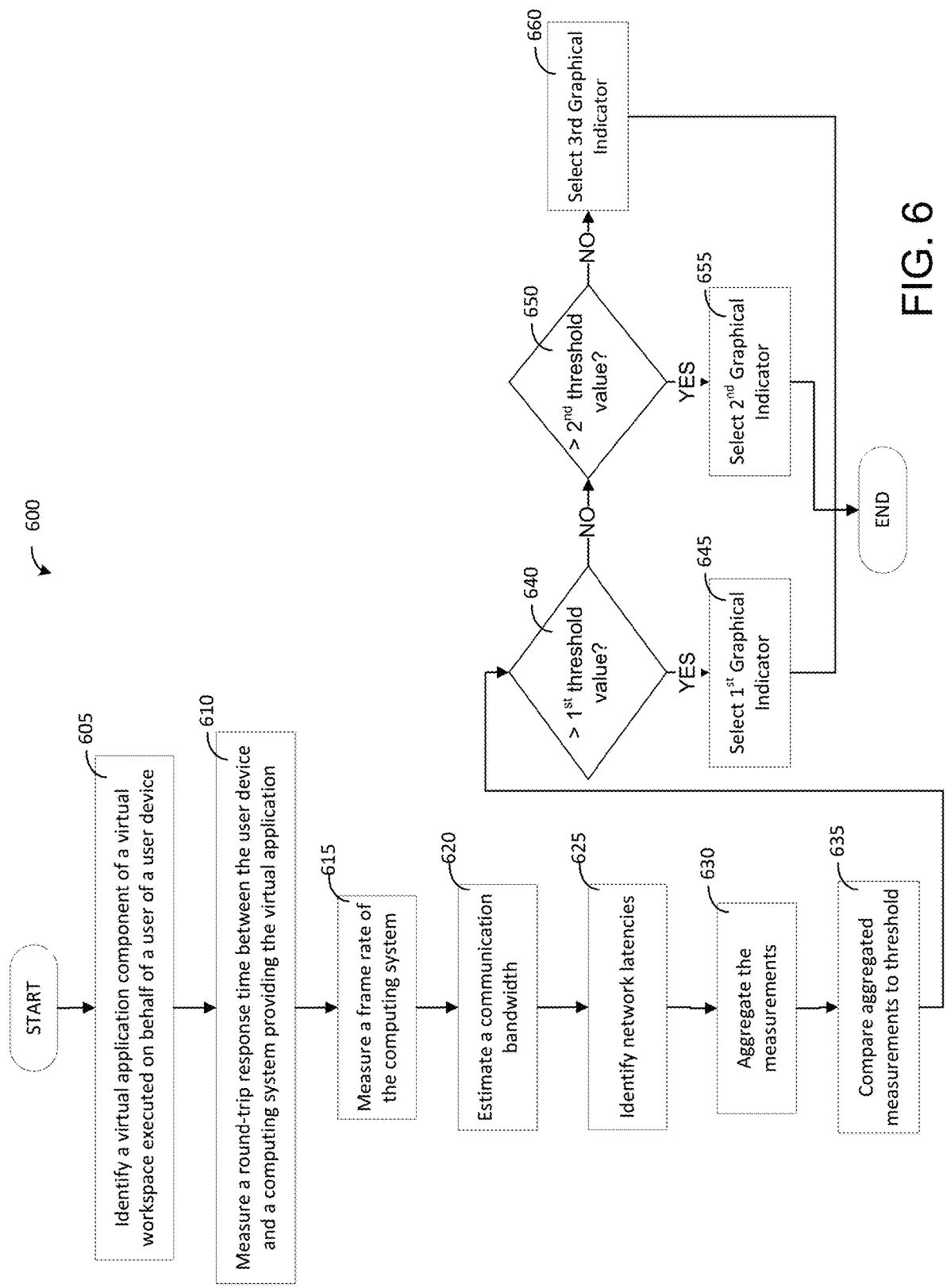
FIG. 6 is a flow diagram of a method for selecting a graphical performance indicator for a virtual application, according to some embodiments.

Referring now to FIG. 6, a method 600 of selecting a graphical performance indicator for a virtual application is shown, according to some embodiments. The functionalities of the method 600 may be implemented using, or performed by, the components detailed herein in connection with FIGS. 1-4. In brief overview, the method 600 of FIG. 6 may be used, for example, to select the graphical performance indicator for each of the desktops 406 shown in FIG. 4. In the example shown in FIG. 4, the graphical performance indicator for each of the desktops 406 may be selected based on a round-trip response time, a frame rate (e.g., FPS), estimated communication bandwidth, and network latency. In some embodiments, the graphical indicator may be presented in a session of the virtual application or desktop. In some embodiments, the graphical indicator may be displayed on the web UI (e.g., as shown in FIG. 4) prior to the user launching a session for the virtual application or desktop. For example, in some embodiments, the virtual session may be run in the background to determine the expected experience for a particular one of the virtual application or desktop to display a corresponding graphical indicator on the web UI, and once the web UI is opened, the virtual session may be used to periodically update the graphical indicators on the web UI.

In more detail, the process 600 starts and at operation 605, a virtual application component of a virtual workspace executed on behalf of a user of a user device is identified. For example, in some embodiments, the component identifier 310 of the workspace experience agent 300 may receive a notification or alert from the embedded browser 122 or the web services manager 110 that the user device 104 is requesting the web UI from the web services manager 110 for presentation on the embedded browser 122 of the user device 104. In this case, the component identifier 310 may determine that at least one of the resources or applications (e.g., virtualization services) that the user is authorized to access via the web UI includes the virtual application.

At operation 610, a round-trip response time between the user device 104 and a computing system providing the virtual application is measured. For example, in some embodiments, the performance analyzer 312 of the workspace experience agent 300 may measure a request time from when the remote session agent 126 transmits a request to the virtualization manager 112 and a response time of when the virtualization manager 112 transmits a response to the request. In some embodiments, the round-trip response time may be a combination of the request time and the response time. In some embodiments, the round-trip response time may be measured for a group of similarly situated users (e.g., users located in the same or similar network segment or physical location (e.g., office)). For example, the round-trip response time that is measured, calculated, or received for one user of the group of similarly situated users may be used for other users of the group of similarly situated users to reduce a time for selecting and displaying a corresponding one of the graphical indicators.

At operation 615, a frame rate of the computing system providing the virtual application is measured. For example, in some embodiments, the performance analyzer 312 of the workspace experience agent 300 may measure a frame rate of the virtualization manager 112 (or another remote device hosting the desktop corresponding to the virtual application) to determine how quickly the graphics of the virtual application or desktop can be streamed or presented on the user device.

At operation 620, a communication bandwidth is estimated. For example, in some embodiments, the performance analyzer 312 may analyze the communication bandwidth of the network used for communications conducted between the remote session agent 126 of the user device 104 and the virtualization manager 112 of the workspace platform 102.

At operation 625, network latencies are identified. For example, in some embodiments, the performance analyzer 312 may identify any network latencies in the network used to conduct transactions between the remote session agent 126 of the user device 104 and the virtual application accessed via the virtualization manager 112 of the workspace platform 102. In other embodiments, the network latencies may be received from another device (e.g., an intermediate device) between the user device 104 and the workspace platform 102 (e.g., a network gateway, Citrix Secure Web gateway, and/or any suitable Cloud service) directly or indirectly.

At operation 630, the measurements from operations 610-625 are aggregated. For example, in some embodiments, the aggregator 314 of the workspace experience agent 300 may normalize and combine the measurements from operations 610-625. For example, in some embodiments, the aggregator 314 may normalize the frame rate determined in operation 615, the communications bandwidth determined in operation 620, and the network latencies determined in operation 625 into a time domain, and may combine these measurements with the round-trip response time determined in operation 610. In some embodiments, the aggregator 314 may apply suitable weights to the measurements prior to combining the measurements. For example, in some embodiments, the aggregator 314 may multiply each of the measurements with a suitable coefficient corresponding to a weightage of the measurement. In some embodiments, the weighted measurements may then be combined (e.g., added, multiplied, or the like) by the aggregator 314. For example, in some embodiments, greater weights may be applied to the round-trip time and frame rate compared to the communication bandwidth and network latencies.

At operation 635, the aggregated measurement resulting from operation 630 is compared to a threshold. For example, in some embodiments, the comparator 316 of the workspace experience agent 300 may compare the aggregated measurement with one or more threshold values. The threshold values may be set or predetermined to correspond to a plurality of performance ranges. For example, a $1^{st}$ threshold value may correspond to a best or optimal performance, and a $2^{nd}$ threshold value may correspond to a bad or poor performance. In some embodiments, the $1^{st}$ and $2^{nd}$ threshold values in the case of a virtual application may be different from the threshold values for other cases (e.g., web applications, network applications, file access applications, or the like).

In this case, as shown in FIG. 6, the aggregated measurement resulting from operation 630 is compared with the $1^{st}$ threshold value at operation 640. If the aggregated measurement is greater than the $1^{st}$ threshold value at operation 640 (e.g., YES), then a $1^{st}$ graphical indicator indicating the best or optimal performance is selected (e.g., by the index selector 318 of the workspace experience agent 300) at operation 645 and the process 600 ends. On the other hand, if the aggregated measurement is not greater than the $1^{st}$ threshold value at operation 640 (e.g., NO), then the aggregated measurement is compared with the second threshold value at operation 650. If the aggregated measurement is greater than the $2^{nd}$ threshold value at operation 650 (e.g., YES), then the aggregated measurement is determined to be between the $1^{st}$ threshold value and the $2^{nd}$ threshold value. Accordingly, a $2^{nd}$ graphical indicator indicating OK or medium performance is selected at operation 655 and the process 600 ends. On the other hand, if the aggregated measurement is less than the $2^{nd}$ threshold value at operation 650 (e.g., NO), then a $3^{rd}$ graphical indicator indicating bad or poor performance is selected at operation 660 and the process 600 ends.

Figure 7:
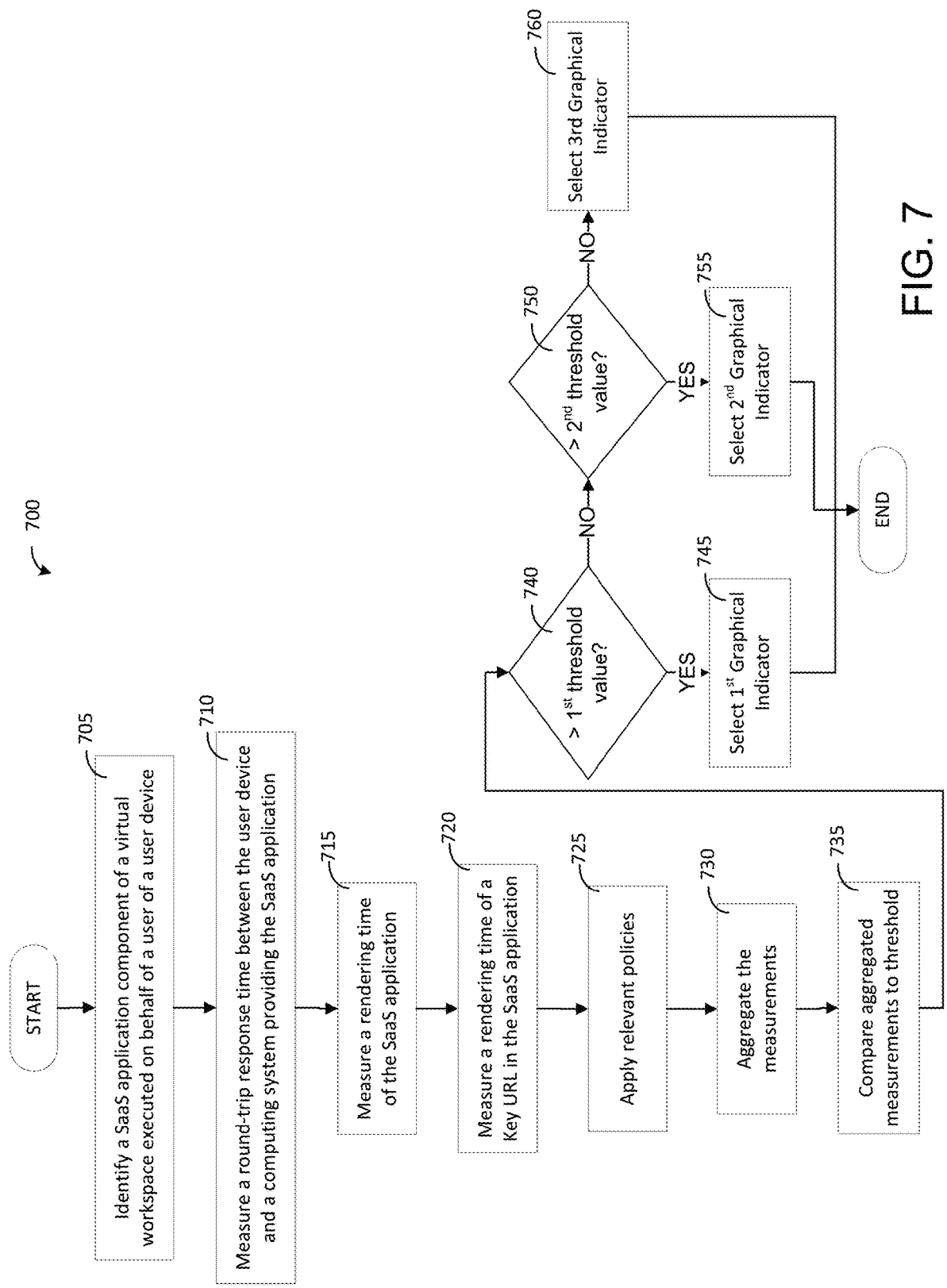
FIG. 7 is a flow diagram of a method for selecting a graphical performance indicator for a network application, according to some embodiments.

Referring now to FIG. 7, a method 700 of selecting a graphical performance indicator for a network application (e.g., a SaaS application) is shown, according to some embodiments. The functionalities of the method 700 may be implemented using, or performed by, the components detailed herein in connection with FIGS. 1-4. In brief overview, the method 700 of FIG. 7 may be used, for example, to select the graphical performance indicator for each of the applications 404 shown in FIG. 4. In the example shown in FIG. 4, the graphical performance indicator for each of the applications 404 may be selected based on a round-trip response time, a rendering time, a key URL rendering time, and one or more configuration policies. For example, in some embodiments, the configuration policies may determine where the network application is running, for example, locally in the embedded browser 122 or remotely in a secured browser service. In some embodiments, the graphical performance indicator may be shown in a detailed view of a micro application (e.g., a SaaS micro application).

In some embodiments, the graphical performance indicator may be shown on a notification action. For example, in some embodiments, if the user clicks on an approval for an expense report within a network application or micro application, and it is taking longer to process the action, then a graphical performance indicator may be shown on the approval button corresponding to a time required to process the action. In some embodiments, the network application or micro application that processes the notification action can provide an alternate or best path to a resource based on the graphical performance indicator. For example, in some embodiments, the workspace experience agent 300 can pre-check whether the network application should be opened in a built-in micro application or in a different browser, since there are no assurances that the user experience is improved in the micro application than another browser (e.g., a virtual browser).

In more detail, the process 700 starts and at operation 705, a network application component (shown as a SaaS application in this example) of a virtual workspace executed on behalf of a user of a user device is identified. For example, in some embodiments, the component identifier 310 of the workspace experience agent 300 may receive a notification or alert from the embedded browser 122 or the web services manager 110 that the user device 104 is requesting the web UI from the web services manager 110 for presentation on the embedded browser 122 of the user device 104. In this case, the component identifier 310 may determine that at least one of the resources or applications (e.g., virtualization services) that the user is authorized to access via the web UI includes the network application.

At operation 710, a round-trip response time between the user device 104 and a computing system providing the SaaS application is measured. For example, in some embodiments, the performance analyzer 312 of the workspace experience agent 300 may measure a request time from when the embedded browser 122 transmits a request to the application manager 114 of the workspace platform 102 and a response time of when the application manager 114 transmits a response to the request. In some embodiments, the round-trip response time may be a combination of the request time and the response time. In other embodiments, the round-trip response time may be received from another device (e.g., an intermediate device) between the embedded browser 122 and the application manager 114 (e.g., a network gateway, Citrix Secure Web gateway, and/or any suitable Cloud service) directly or indirectly.

At operation 715, a rendering time of the SaaS application is measured. For example, in some embodiments, the performance analyzer 312 of the workspace experience agent 300 may measure a time it takes to render content of the SaaS application. In other embodiments, the rendering time may be received from another device (e.g., an intermediate device, such as, for example, a network gateway, Citrix Secure Web gateway, and/or any suitable Cloud service) directly or indirectly.

At operation 720, a rendering time of a probe or key URL in the SaaS application is measured. For example, in some embodiments, the SaaS application may include a probe or key URL to retrieve content from a remote computer system. In this case, the performance analyzer 312 may measure a time it takes to render the content from the remote computer system associated with the probe or key URL. In other embodiments, the rendering time of the probe or key URL may be received from another device (e.g., an intermediate device, such as, for example, a network gateway, Citrix Secure Web gateway, and/or any suitable Cloud service) directly or indirectly.

At operation 725, one or more relevant policies are applied. For example, in some embodiments, the performance analyzer 312 may identify one or more policies for accessing the SaaS application. In this case, the one or more policies may determine where and how the SaaS application should be executed, such as locally via the embedded browser 122 or remotely via a secure browser service. In this case, the relevant policies are used to determine other performance factors that can affect the experience of the particular network application. For example, in the case where the one or more relevant policies dictate that the SaaS application should be opened via the remote secure browser service, the performance analyzer 312 may measure a round-trip response time to the remote secure browser service to include this performance factor into the analysis for selecting a corresponding graphical indicator. In other embodiments, the round-trip response time to the remote secure browser service may be received from another device (e.g., an intermediate device, such as, for example, a network gateway, Citrix Secure Web gateway, and/or any suitable Cloud service) directly or indirectly.

At operation 730, the relevant measurements from operations 710-725 are aggregated. For example, in some embodiments, the aggregator 314 of the workspace experience agent 300 may normalize and combine the measurements from operations 710-725. In some embodiments, the aggregator 314 may apply suitable weights to the measurements prior to combining the measurements. For example, in some embodiments, the aggregator 314 may multiply each of the measurements with a suitable coefficient corresponding to a weightage of the measurement. In some embodiments, the weighted measurements may then be combined (e.g., added, multiplied, or the like) by the aggregator 314. In some embodiments, the aggregator 314 may combine other measurements obtained based on one or more of the relevant policies applied in operation 725. For example, in some embodiments, the one or more relevant policies may dictate that a first component of the network application is rendered by a remote computing device, and in this case, the aggregator 314 may combine a measurement of a rendering time of the virtual workspace at the remote computing device and a transfer time to transfer a rendered graphic (e.g., an image) from the remote computing device to the user device 104.

At operation 735, the aggregated measurement resulting from operation 730 is compared to a threshold. For example, in some embodiments, the comparator 316 of the workspace experience agent 300 may compare the aggregated measurement with one or more threshold values. The threshold values may be set or predetermined to correspond to a plurality of performance ranges. For example, a $1^{st}$ threshold value may correspond to a best or optimal performance, and a $2^{nd}$ threshold value may correspond to a bad or poor performance. In some embodiments, the $1^{st}$ and $2^{nd}$ threshold values in the case of a network application may be different from the threshold values for other cases (e.g., web applications, virtual applications, file access applications, or the like).

In this case, as shown in FIG. 7, the aggregated measurement resulting from operation 730 is compared with the $1^{st}$ threshold value at operation 740. If the aggregated measurement is greater than the $1^{st}$ threshold value at operation 740 (e.g., YES), then a $1^{st}$ graphical indicator indicating the best or optimal performance is selected (e.g., by the index selector 318 of the workspace experience agent 300) at operation 745 and the process 700 ends. On the other hand, if the aggregated measurement is not greater than the $1^{st}$ threshold value at operation 740 (e.g., NO), then the aggregated measurement is compared with the second threshold value at operation 750. If the aggregated measurement is greater than the $2^{nd}$ threshold value at operation 750 (e.g., YES), then the aggregated measurement is determined to be between the $1^{st}$ threshold value and the $2^{nd}$ threshold value. Accordingly, a $2^{nd}$ graphical indicator indicating OK or medium performance is selected at operation 755 and the process 700 ends. On the other hand, if the aggregated measurement is less than the $2^{nd}$ threshold value at operation 750 (e.g., NO), then a 3rd graphical indicator indicating bad or poor performance is selected at operation 760 and the process 700 ends.

Figure 8:
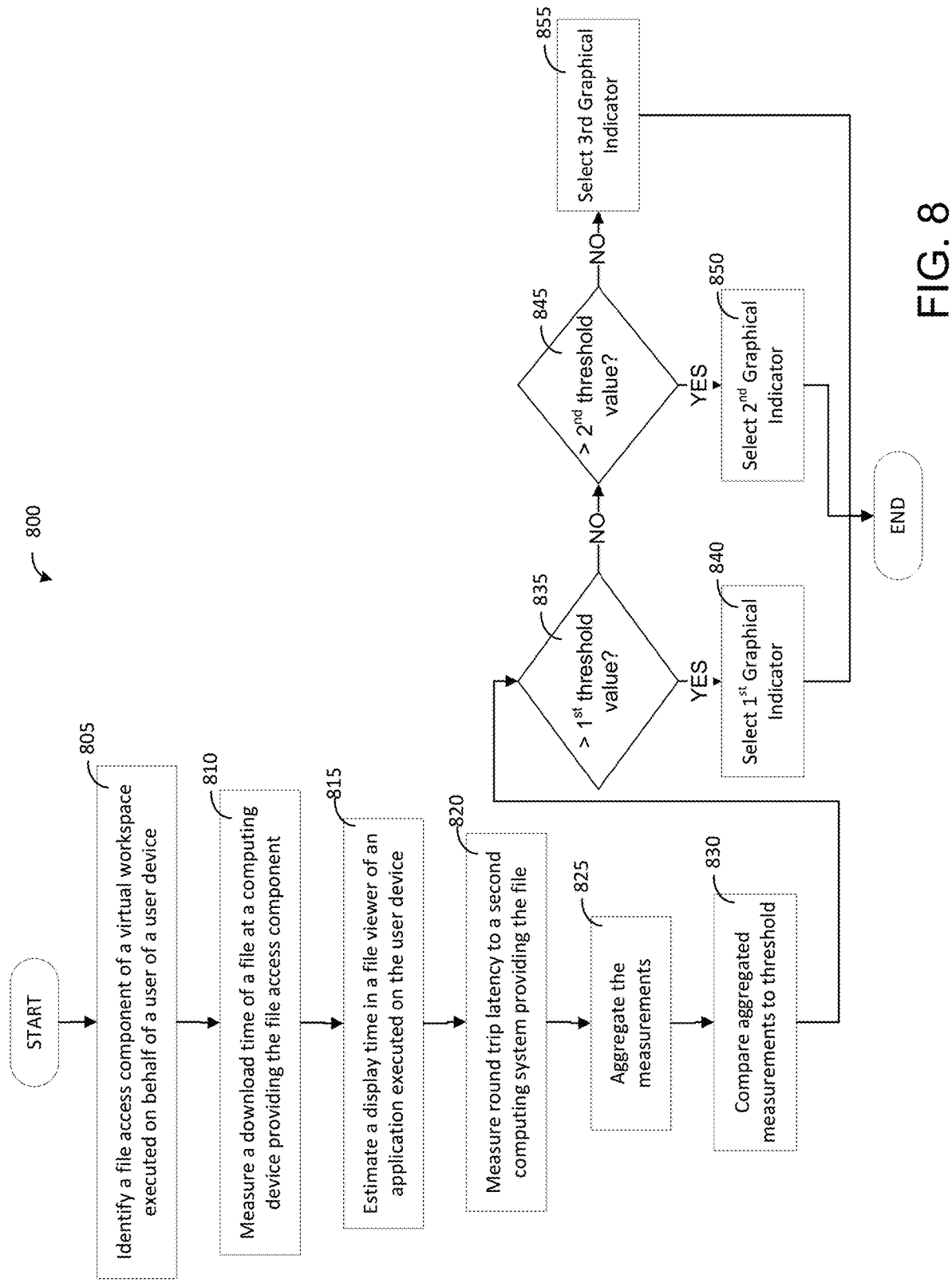
FIG. 8 is a flow diagram of a method for selecting a graphical performance indicator for a file access component, according to some embodiments.

Referring now to FIG. 8, a method 800 of selecting a graphical performance indicator for a file access component, according to some embodiments. The functionalities of the method 800 may be implemented using, or performed by, the components detailed herein in connection with FIGS. 1-4. In brief overview, the method 800 of FIG. 8 may be used, for example, to select the graphical performance indicator for each of the files 408 shown in FIG. 4. In the example shown in FIG. 4, some of the files 408 may be stored on different storage devices or may be served from different file storage services from other ones of the files 408. Thus, in the example shown in FIG. 4, the graphical performance indicator may be selected based on a file download time, a file view time (or rendering time) in a file viewer application, and a round-trip latency time to a resource (e.g., computing device) location that stores or otherwise serves the file.

In more detail, the process 800 starts and at operation 805, a file access component of a virtual workspace executed on behalf of a user of a user device is identified. For example, in some embodiments, the component identifier 310 of the workspace experience agent 300 may receive a notification or alert from the embedded browser 122 or the web services manager 110 that the user device 104 is requesting the web UI from the web services manager 110 for presentation on the embedded browser 122 of the user device 104. In this case, the component identifier 310 may determine that at least one of the resources or applications (e.g., virtualization services) that the user is authorized to access via the web UI includes the file access component.

At operation 810, a download time of a file corresponding to the file access component at a computing device providing the file access component is measured. For example, in some embodiments, the file may be stored in a remote storage device and the storage manager 116 of the workspace platform 102 may download the file from the remote storage device. In this case, the performance analyzer 312 of the workspace experience agent 300 may measure a downloading time of the file by the storage manager 116. In some embodiments, the downloading time may be estimated for a group of similarly situated users (e.g., users located in the same or similar physical location (e.g., office)) for the same remote storage device (or file server). For example, the downloading time that may be estimated, measured, calculated, or received for one user of the group of similarly situated users from the remote storage device may be used for other users of the group of similarly situated users for the same remote storage device to reduce a time for selecting and displaying a corresponding one of the graphical indicators.

At operation 815, a display (or rendering) time of the file in a file viewer of an application executed on the user device is estimated. For example, in some embodiments, the performance analyzer 312 may estimate the display time or rendering time of the file in a file viewer application accessed via a network application (e.g., SaaS application) or virtual application (e.g., hosted or virtual desktop).

At operation 820, round-trip latency to a second computing system providing the file is measured. For example, in some embodiments, the performance analyzer 312 of the workspace experience agent 300 may measure a request time from when the embedded browser 122 transmits a request to the storage manager 116 for the file, and a response time of when the web services manager 110 transmits a response to the request. In some embodiments, the workspace experience agent 300 may similarly measure a request and response time between the storage manager 116 and the remote storage device that serves the file. In some embodiments, the round-trip response time may be any suitable combination of the request times and the response times. In other embodiments, the round-trip latency may be received from another device (e.g., an intermediate device, such as, for example, a network gateway, Citrix Secure Web gateway, and/or any suitable Cloud service) directly or indirectly.

At operation 825, the measurements are aggregated. For example, in some embodiments, the aggregator 314 of the workspace experience agent 300 may combine (e.g., add, multiply, or the like) the measurements determined in operations 810-820. In some embodiments, the aggregator 314 may apply suitable weights to the measurements prior to combining the measurements. For example, in some embodiments, the aggregator 314 may multiply each of the measurements with a suitable coefficient corresponding to a weightage of the measurement. In some embodiments, the weighted measurements may then be combined (e.g., added, multiplied, or the like) by the aggregator 314.

At operation 830, the aggregated measurement resulting from operation 825 is compared to a threshold. For example, in some embodiments, the comparator 316 of the workspace experience agent 300 may compare the aggregated measurement with one or more threshold values. The threshold values may be set or predetermined to correspond to a plurality of performance ranges. For example, a $1^{st}$ threshold value may correspond to a best or optimal performance, and a $2^{nd}$ threshold value may correspond to a bad or poor performance. In some embodiments, the $1^{st}$ and $2^{nd}$ threshold values in the case of a file access components may be different from the threshold values for other cases (e.g., web applications, virtual applications, network applications, or the like).

In this case, as shown in FIG. 8, the aggregated measurement resulting from operation 825 is compared with the $1^{st}$ threshold value at operation 835. If the aggregated measurement is greater than the $1^{st}$ threshold value at operation 835 (e.g., YES), then a $1^{st}$ graphical indicator indicating the best or optimal performance is selected (e.g., by the index selector 318 of the workspace experience agent 300) at operation 840 and the process 800 ends. On the other hand, if the aggregated measurement is not greater than the $1^{st}$ threshold value at operation 835 (e.g., NO), then the aggregated measurement is compared with the second threshold value at operation 845. If the aggregated measurement is greater than the $2^{nd}$ threshold value at operation 845 (e.g., YES), then the aggregated measurement is determined to be between the $1^{st}$ threshold value and the $2^{nd}$ threshold value. Accordingly, a $2^{nd}$ graphical indicator indicating OK or medium performance is selected at operation 850 and the process 800 ends. On the other hand, if the aggregated measurement is less than the $2^{nd}$ threshold value at operation 845 (e.g., NO), then a $3^{rd}$ graphical indicator indicating bad or poor performance is selected at operation 855 and the process 800 ends.

Figure 9:
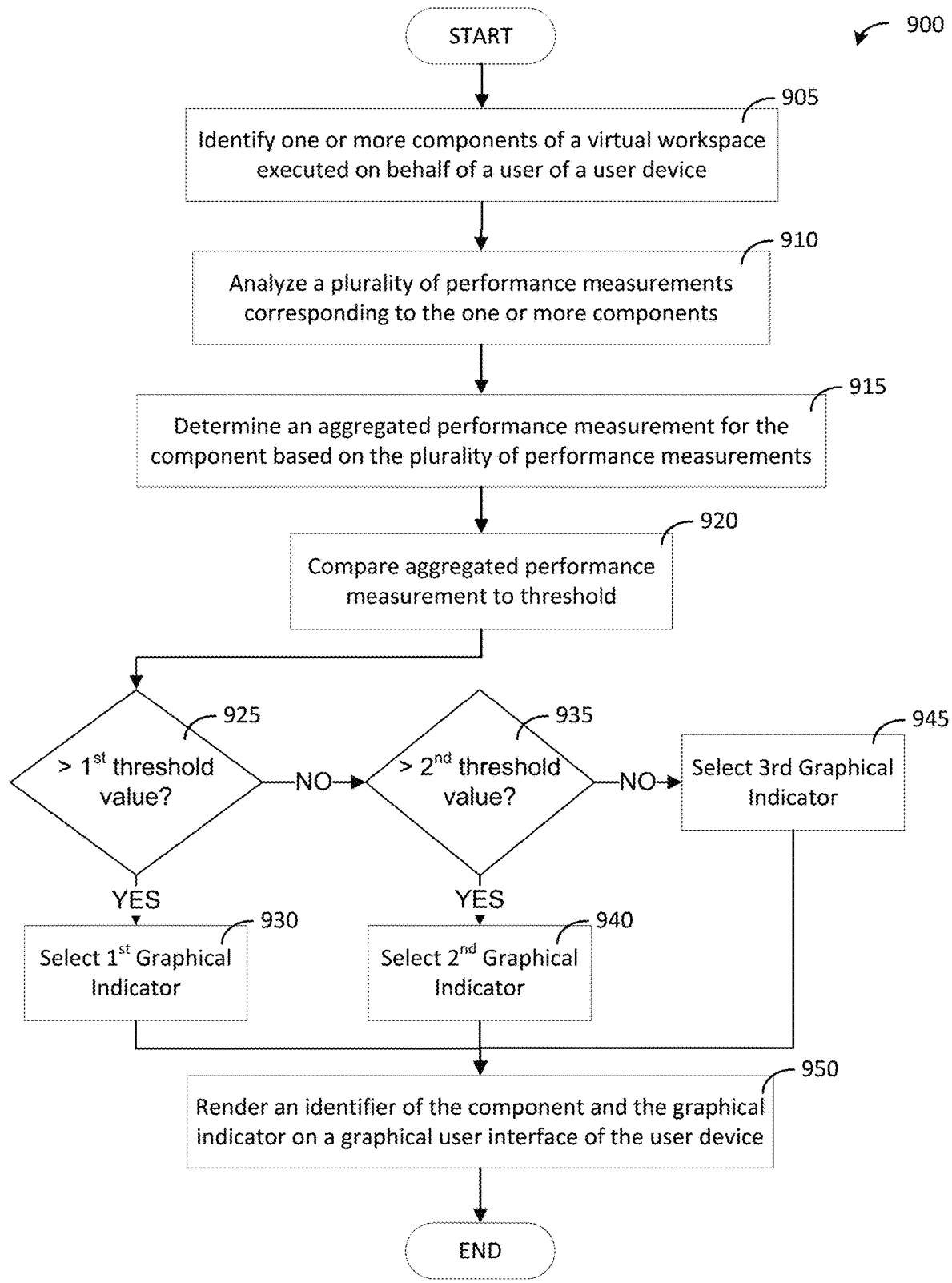
FIG. 9 is a flow diagram of a method for presenting a graphical performance indicator for one or more components of a virtual workspace, according to some embodiments.

Referring now to FIG. 9, a method 900 of presenting a graphical performance indicator for one or more components of a virtual workspace is shown, according to some embodiments. The functionalities of the method 900 may be implemented using, or performed by, the components detailed herein in connection with FIGS. 1-4. In brief overview, the method 900 of FIG. 9 may be used in connection with one or more of the methods 500, 600, 700, and 800 described with reference to FIGS. 5-8 to present a graphical identifier for each of the components on a user interface (e.g., the web UI) of the user device. For example, the method 900 of FIG. 9 may be used to display (or render) the web UI 400 shown in FIG. 4, including the graphical indicators 410a-410c for each of the applications 404, desktops 406, files 408, and the connection identifier 402 to the web UI itself.

In more detail, the process 900 starts and at operation 905, one or more components (e.g., web applications, network applications, virtual applications, file access components, and/or the like) of a virtual workspace executed on behalf of a user of a user device is identified. For example, in some embodiments, the component identifier 310 of the workspace experience agent 300 may receive a notification or alert from the embedded browser 122 or the web services manager 110 that the user device 104 is requesting the web UI from the web services manager 110 for presentation on the embedded browser 122 of the user device 104. In this case, the component identifier 310 may determine that the web UI includes one or more virtualization service components that the user is authorized to access via the web UI.

At operation 910, a plurality of performance measurements corresponding to the one or more components are analyzed. For example, the performance measurements for each of the identified components may be analyzed by the performance analyzer 312 using any of the methods discussed with reference to FIGS. 5-8 to receive, measure, or calculate the performance measurements for each corresponding ones of the components. For example, in some embodiments, the performance analyzer 312 of the workspace experience agent 300 may measure a round-trip response time between the user device 104 and a resource, application, or server of the workspace platform 102 providing the corresponding component. In some embodiments, the performance analyzer 312 may measure a rendering time of the virtual workspace at the user device 104. In some embodiments, the performance analyzer 312 may measure a communication bandwidth between the user device 104 and a resource, application, or server of the workspace platform 102 providing the virtual workspace. In some embodiments, the performance analyzer 312 may estimate or receive an estimated performance measurement for a corresponding component. In some embodiments, the estimation may be performed prior to execution of the corresponding component on the user device 104.

At operation 915, an aggregated performance measurement for each of the one or more components may be determined based on the plurality of performance measurements corresponding to each of the one or more components. For example, in some embodiments, the aggregator 314 of the workspace experience agent 300 may combine (e.g., add, multiply, or the like) the performance measurements using any of the methods 500, 600, 700, and 800 discussed with reference to FIGS. 5-8. In some embodiments, a first component of the one or more components may be rendered by a remote computing system, and a measurement of a rendering time of the first component at the remote computing system may be combined with a transfer time to transfer the rendered component to the user device 104. In some embodiments, the aggregator 314 may apply weightages to the performance measurements depending on that performance measurement's effect on the expected performance of the component. For example, in some embodiments, the aggregator 314 may multiply each of the performance measurements by a predetermined coefficient for a corresponding measurement, the predetermined coefficient corresponding to the weightage of the corresponding measurement. For example, in some embodiments, a latency performance measurement for a corresponding component may be weighted more heavily than a display resolution performance measurement for the corresponding component, and thus, the coefficient for the latency performance measurement may exceed the coefficient for the display resolution measurement.

At operation 920, the aggregated performance measurement for each of the one more components may be compared with a corresponding threshold. For example, in some embodiments, the comparator 316 of the workspace experience agent 300 may compare the aggregated performance measurements with the corresponding threshold. In some embodiments, the threshold for one type of component may be different from the threshold for another type of component. For example, in some embodiments, each of the web application, network application, virtual application, and file access component types may have a corresponding threshold, and the threshold corresponding to at least one of the component types may be different than that of another component type. In some embodiments, each of the thresholds may include a plurality of threshold values. For example, as shown in FIG. 9, the threshold may include a first threshold value and a second threshold value. In some embodiments, the plurality of threshold values corresponding to at least one of the component types may be different than those of another component type.

For example, as shown in FIG. 9, in some embodiments, the comparison operation 920 may include a comparison (e.g., by the comparator 316) of the aggregated performance measurement with the first threshold value at operation 925 and the second threshold value at operation 935. In this case, if the aggregated performance measurement is greater than the first threshold value at operation 925 (e.g., YES), then the index selector 318 of the workspace experience agent 300 may select a $1^{st}$ graphical indicator indicating the best or optimal performance at operation 930. On the other hand, if the aggregated measurement is not greater than the $1^{st}$ threshold value at operation 925 (e.g., NO), then the aggregated measurement is compared (e.g., by the comparator 316) with the second threshold value at operation 935. If the aggregated measurement is greater than the second threshold value at operation 935 (e.g., YES), then the index selector 318 selects a $2^{nd}$ graphical indicator indicating OK or medium performance at operation 940, since the aggregated performance measurement is between the first threshold value and the second threshold value. On the other hand, if the aggregated performance measurement is less than the second threshold value at operation 935 (e.g., NO), then the index selector 318 selects a $3^{rd}$ graphical indicator indicating bad or poor performance is at operation 945.

In some embodiments, the index selector 318 provides the selected graphical indicator for the corresponding component and an identifier (e.g., icon) for the corresponding component to the embedded browser 122 or the web services manager 110, such that the graphical indicator can be presented on the web UI (e.g., as shown in FIG. 4). Thus, at operation 950, the identifier of each of the one or more components and the corresponding graphical indicator is rendered on a graphical user interface of the user device 104. For example, the identifier of each of the one or more components and the corresponding graphical indicator may be rendered on the web UI by the embedded browser 122 as shown in the example web UI 400 in FIG. 4.

Various elements, which are described herein in the context of one or more embodiments, may be provided separately or in any suitable combination or subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A method for indicating virtual workspace performance on a graphical user interface of a computer system, comprising:
   identifying, by a first computer system, a plurality of components accessible to the first computer system via a virtual workspace hosted on a second computer system on behalf of a user of the first computer system, each of the plurality of components hosted on a corresponding server of a plurality of servers, each of the plurality of components configured to provide at least one of a resource or an application to the first computer system via the virtual workspace;
   for each component of the plurality of components:
   analyzing, by the first computer system prior to accessing the component, a plurality of performance factors between the first computer system with the server of the plurality of servers hosting the component via the virtual workspace, the plurality of performance factors including a rendering time of the component at the second computer system and a transfer time to transfer the rendered component from the second computer system to the first computer system;
   determining, by the first computer system, an estimated performance measurement for experience by the user of the first computer system with the component when accessed based at least on the plurality of performance factors and a corresponding plurality of coefficients, the plurality of coefficients having a first coefficient for the rendering time and a second coefficient for the transfer time, the second coefficient exceeding the first coefficient;
   comparing, by the first computer system, the estimated performance measurement to a threshold,
   selecting, by the first computer system, a graphical indicator from a plurality of predetermined graphical indicators responsive to the comparison, and
   rendering, by the first computer system within a graphical user interface for the virtual workspace, an identifier of the component and the selected graphical indicator indicating the estimated performance measurement for the first computer system.

2. The method of claim 1, wherein analyzing the plurality of performance factors further comprises measuring a round trip response time between the first computer system and the second computer system providing the virtual workspace.

3. The method of claim 1, wherein analyzing the plurality of performance factors further comprises measuring a rendering time of the virtual workspace at the second computer system.

4. The method of claim 1, wherein analyzing the plurality of performance factors further comprises measuring a communication bandwidth between the computer system and the second computer system providing the virtual workspace.

5. The method of claim 1, wherein the determining the estimated performance measurement further comprises combining a plurality of performance factors.

6. The method of claim 1, wherein analyzing the plurality of performance factors further comprises receiving the estimated performance measurement for a corresponding component of the plurality of components, a determination of the estimated performance measurement performed prior to execution of the component for the user of the computer system.

7. The method of claim 1, wherein selecting the graphical indicator further comprises selecting the graphical indicator responsive to the estimated performance measurement exceeding the threshold.

8. A system for indicating virtual workspace performance on a graphical user interface of a computer system, comprising:
   a first computer system comprising one or more processors, configured to:
   identify, a plurality of components accessible to the first computer system via a virtual workspace hosted on a second computer system on behalf of a user of the first computer system, each of the plurality of components hosted on a corresponding server of a plurality of servers, each of the plurality of components configured to provide at least one of a resource or an application to the first computer system via the virtual workspace;
   for each component of the plurality of components:
   analyze, prior to accessing the component, a plurality of performance factors between the first computer system with the server of the plurality of servers hosting the component via the virtual workspace, the plurality of performance factors including a rendering time of the component at the second computer system and a transfer time to transfer the rendered component from the second computer system to the first computer system;
   determine an estimated performance measurement for experience by the user of the first computer system with the component when accessed based at least on the plurality of performance factors and a corresponding plurality of coefficients, the plurality of coefficients having a first coefficient for the rendering time and a second coefficient for the transfer time, the second coefficient exceeding the first coefficient;
   compare the estimated performance measurement to a threshold;
   select a graphical indicator from a plurality of predetermined graphical indicators responsive to the comparison; and
   render, within a graphical user interface for the virtual workspace, an identifier of the component and the selected graphical indicator indicating the estimated performance measurement for the first computer system.

9. The system of claim 8, wherein the first computer system is further configured to measure a round trip response time between the first computer system and the second computer system providing the virtual workspace.

10. The system of claim 8, wherein the first computer system is further configured to measure a rendering time of the virtual workspace at the first computer system.

11. The system of claim 8, wherein the first computer system is further configured to measure a communication bandwidth between the first computer system and the second computer system providing the virtual workspace.

12. The system of claim 8, wherein the first computer system is further configured to determine the estimated performance measurement by combining a plurality of performance factors.

13. The system of claim 8, wherein the first computer system is further configured to receive the estimated performance measurement for a corresponding component of the plurality of components, a determination of the estimated performance measurement performed prior to execution of the component for the user of the first computer system.

14. The system of claim 8, wherein the first computer system is further configured to select the graphical indicator responsive to the estimated performance measurement exceeding the threshold.

\* \* \* \* \*